Sept. 18, 1923.
A. HOGAN
1,468,298
DEVICE FOR CONDENSING THE MOISTURE IN THE BREATH
Original Filed Dec. 16, 1918    2 Sheets-Sheet 1
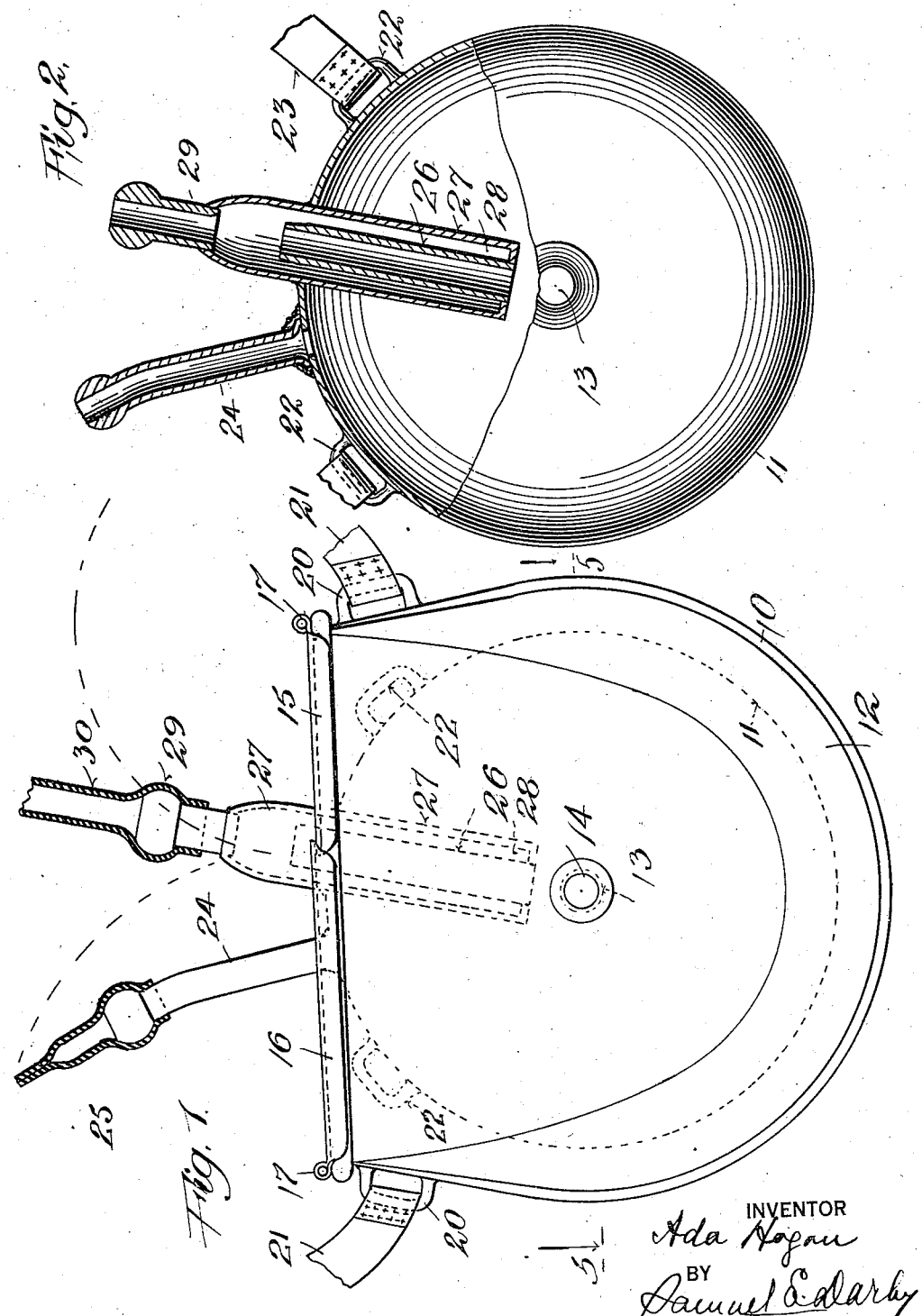
INVENTOR
Ada Hogan
BY
Samuel E. Darby
ATTORNEY

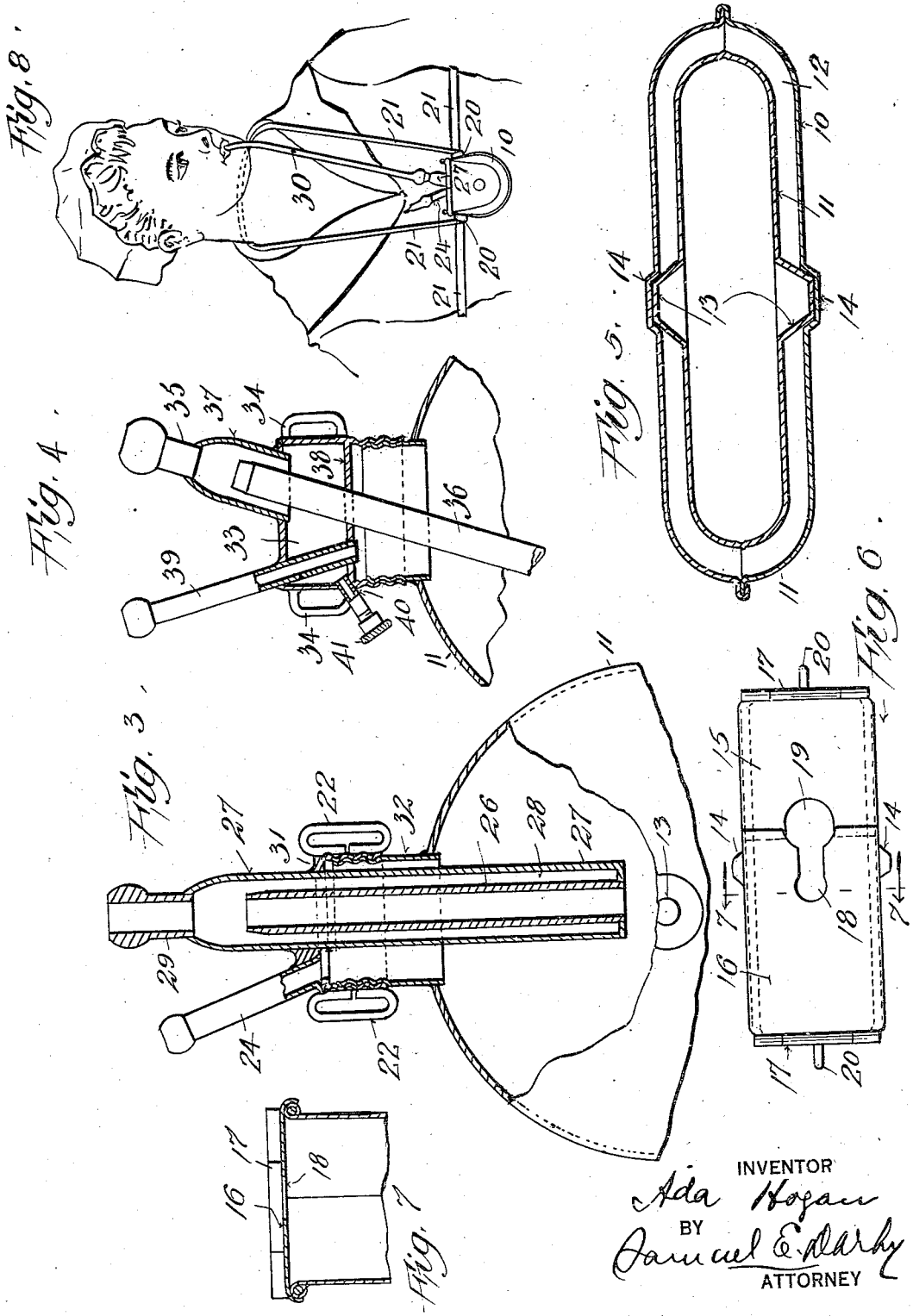

Patented Sept. 18, 1923.

1,468,298

UNITED STATES PATENT OFFICE.

ADA HOGAN, OF BROOKLYN, NEW YORK, ASSIGNOR, BY MESNE ASSIGNMENTS, TO CHARLES W. ARMBRUST, OF ALBANY, NEW YORK.

DEVICE FOR CONDENSING THE MOISTURE IN THE BREATH.

Application filed December 16, 1918, Serial No. 266,885. Renewed February 14, 1923.

*To all whom it may concern:*

Be it known that I, ADA HOGAN, a citizen of the United States, residing at Brooklyn, county of Kings, State of New York, have made a certain new and useful Invention in Devices for Condensing the Moisture in the Breath, of which the following is a specification.

This invention relates to devices for condensing and collecting the moisture contained in the breath.

The object of the invention is to provide a device which is simple in construction, economical to manufacture, and efficient for condensing and collecting the moisture contained in breath exhalations.

A further object of the invention is to provide a device of the nature referred to which traps and separates any saliva which may be exhaled with the breath.

Other objects of the invention will appear more fully hereinafter.

The invention consists substantially in the construction, combination, location and relative arrangement of parts, all as will be more fully hereinafter set forth, as shown in the accompanying drawings, and finally pointed out in the appended claims.

In the accompanying drawings,—

Figure 1 is a view in side elevation of a device embodying the principles of my invention.

Fig. 2 is a similar view, parts broken out and parts in section, showing one form of vessel embodying my invention, removed from the container.

Fig. 3 is a view similar to Fig. 2, showing another form of vessel embraced within the scope of my invention.

Fig. 4 is a view similar to Figs. 2 and 3, showing a modified form of saliva trap.

Fig. 5 is a view in transverse section through a vessel and its container.

Fig. 6 is a view in top plan of one form of container.

Fig. 7 is a broken view in section on the line 7, 7, Fig. 6.

Fig. 8 is a view showing the manner of application of the device for use.

The same part is designated by the same reference numeral wherever it occurs throughout the several views.

In the application of Charles W. Armbrust, Serial No. 224,697, filed March 25, 1918, is shown, described and claimed broadly a process for manufacturing water for drinking or other purposes consisting in subjecting the human breath of exhalation to condensation and collecting and storing the condensate for use as a method of relieving thirst in case of shipwreck or on a desert or other situation where drinking water is not available.

The present invention relates to apparatus for carrying out this process and the special object in view is to simplify and improve the construction of such devices and to render the same more serviceable and efficient.

In carrying out my invention, in one form of embodiment thereof, I employ a container 10, within which is received and supported a vessel 11, in such manner as to form a space 12 between the vessel and container, as clearly shown in Fig. 5. In practice the container and vessel are preferably constructed of light thin flexible metal, though my invention is not to be restricted in this respect. At diametrically opposite points at the transverse center of the vessel 11, said vessel is formed with extensions or projections 13. Cooperating extensions, or seat portions 14, to receive the projections or extensions 13 are formed in the container 10. Where these parts are formed of metal these extensions and seats may be produced by pressing them out of the metal sides of the vessel and container respectively. The engaging projections 13 and seats 14 serve to position, center and retain the vessel 11 within the container so as to form the space 12 surrounding the vessel 11, while at the same time said vessel is readily detachable and removable by simply springing the projections 13 out of their seats 14. To facilitate the insertion and removal of the vessel 11 and of the extensions 13 thereon into and out of the seats 14 I prefer to form the walls of said projections 13 and seats 14 in conical shape.

The vessel 11 in the particular form shown is preferably and generally shaped similar to the familiar army canteen carried by soldiers, and the container is shaped to conform to that of the vessel and is open at the top to permit the vessel to be inserted therein or removed therefrom. The open end of the container is closed by a door or cover sections 15, 16, see Figs. 1 and 6, which are hinged as at 17 to the ends of the opening in the container. The meeting edges of the hinged cover sections are respectively provided with slots 18, 19, to accommodate the nipples hereinafter to be described and to efficiently retain the vessel within the container when said hinged cover sections are closed and to prevent looseness or rattle of the parts. The container is also provided with loop portions 20 at the sides thereof to afford means for attaching straps 21 by which the device may be suspended around the neck or body of the wearer. Likewise the vessel 11 may be provided with loop devices 22 for attachment thereto of suspending or support straps 23 for use in case the vessel alone is employed.

Extending through the wall of the vessel 11 is a nipple or tube 24, in the form of the device shown in Figs. 1 and 2, to serve the purpose of emptying the water of condensation collected within the vessel 11. If desired a flexible or rubber tube 25 may be attached to the outer end of the nipple 24. Also extending through the wall of the vessel 11 is a nipple device through which the breath when exhaled from a user is introduced into the vessel. In the form shown in Figs. 1 and 2 this nipple device consists of an inner tubular member 26 and an outer tubular member 27, concentrically arranged and joined together at their inner ends to form a pocket or chamber 28, the central bore of the inner tubular member 26 delivering freely into the interior of vessel 11. The outer end of the tubular member 27 extends through the wall of the vessel and carries a mouth piece 29 to which, if desired, may be attached a flexible rubber or other hose section 30. The central bore through the mouth piece 29 delivers into the interior of the tubular member 27 above the open end of the interior tubular member 26.

In operation, and as indicated in Fig. 8, the operator exhales his breath through the tube 30, the mouth piece 29, and into the interior of the tubular member 27. The moisture laden exhalation passes through the central bore of the member 26 into the interior of the vessel 11. Any saliva carried along with the exhaled breath will collect on and slide down the interior walls of the member 27 and will be collected in the space 28, thus separating the saliva from the moisture laden exhaled breath which passes into the interior of the vessel 11. Any saliva collecting in the chamber 28 can be easily removed therefrom and without escape of any collected water within vessel 11, by simply stopping up the nipple 24 and inverting the vessel 11, thereby permitting the collected saliva to escape through the central bore of the mouth piece 29 but without permitting the escape of the water of condensation collected within the vessel 11. The construction of nipple device above described may be directly through the wall of the vessel 11 as shown in Figs. 1 and 2, or they may be applied to a cap 31, see Fig. 3, which is threaded upon a neck 32 of the vessel 11. In this case the nipple 24 and 27, the saliva trap or space 28, and the tubular portion 26 remain the same in structure as above described, the tubular portions 26, 27 being disposed to extend through the cap 31 and neck 32 into the interior of the vessel. In this form of my device the screw cap 31 carrying the nipples may be formed of standard size to fit and to be received on the ordinary regulation or service canteens, which canteens would thereupon serve the purpose of the vessel 11.

Where the nipples are carried by a screw cap as above described the suspending loops 22 may be formed on the cap.

In Fig. 4 I have shown a slightly modified arrangement of screw cap device embodying my invention wherein the saliva chamber 33 is formed in the screw cap 34, the nipple 35 in this case delivering into the chamber 33 of the cap and the tube 36 extending into the tubular part 37 of nipple 35 and also through the wall 38 of the saliva trap or chamber 33, and into the interior of the vessel 11. Likewise the nipple 39 extends through the chamber 33 and into open communication with the interior of vessel 11. If desired a drain opening 40 controlled by a plug 41 may be provided for the saliva chamber 33. In this structure any saliva entering the nipple 35 with the exhaled breath will slide down the inner surface of the tubular portion 37 and will collect within the trap chamber 33 while the moistened or vapor portion of the exhaled breath will pass through the pipe 36 into the interior of vessel 11.

When the vessel 11 is assembled within a container 10 an increased condensing action is attained by filling the space 12 between the walls of the vessel 11 and container 10 with water or other cooling medium.

By constructing the vessel and its container of thin metal a rapid cooling and condensing action results.

In practice it is found that the condensed moisture exhaled from the breath which condenses and collects within the vessel 11 is suitable for use for relieving the pangs of thirst, and it has been found in the use of the devices embodying and containing my invention that a sufficient quantity of condensate for the purpose is secured. It will be understood, of course, that the nipple 24, 39, constitutes a vent or discharge connection, while the nipple 29, 35, and saliva trap construction 28, 33, constitute a supply and trap connection, the exhaled breath being supplied thereto and the moisture laden vapor portion thereof passing to the interior of the vessel while any accompanying saliva is trapped and separated therefrom.

Having now set forth the objects and nature of my invention, and various constructions embodying the principles thereof, what I claim as new and useful, and of my own invention, and desire to secure by Letters Patent, is,—

1. A condenser comprising, a vessel, a supply connection to the interior thereof including a tubular portion, a tube centrally disposed in said tubular portion to form a space therebetween, said central tube opening into the interior of the chamber, the space between said tubular portion and central tube being closed to the interior of said chamber except through said central tube, and a delivery member communicating with the interior of said chamber.

2. A condenser comprising, a vessel having a threaded neck, a screw cap for said neck, a supply connection carried by said cap and communicating with the interior of said vessel, a trap chamber also carried by said cap and associated with said supply connection and a delivery connection also carried by said cap and communicating with the interior of said vessel.

3. A condenser comprising, a vessel having a threaded neck portion, a cap applied to said neck, a supply connection carried by said cap and including a tubular portion having a nipple at its outer end, a tubular member disposed longitudinally within said tubular portion but of smaller diameter to form a space between said tubular portion and said tubular member, said space being closed to the interior of said chamber, said tubular member being open to the interior of said chamber, said nipple delivering to both said tubular member and said space, and a discharge connection also carried by said cap and communicating with the interior of said vessel.

4. A condenser comprising, a vessel having a supply connection and a discharge connection communicating with the interior thereof, said vessel having centrally disposed projections on opposite sides thereof, in combination with a container in which said vessel is removably received, said retainer having seats to receive said projection.

5. A condenser comprising, a vessel having supply and discharge connections communicating with the interior thereof, in combination with a container in which said vessel is removably received, and hinged cover portions for said container, said cover portions having openings in the edge thereof to accommodate said supply and discharge connections.

6. A condenser comprising, a vessel having supply and discharge connections, in combination with a container and centrally disposed projections formed on the vessel at opposite sides thereof to detachably engage within the container to offset the container from the vessel to form a space around the vessel, and a cover for the container.

In testimony whereof I have hereunto set my hand on this 2nd day of December A. D., 1918.

ADA HOGAN.